Jan. 22, 1929.

S. U. HAMAKER 1,699,565

GEAR HOUSING AND BEARING

Filed Aug. 17, 1925

3 Sheets-Sheet 1

Inventor
Sidney U. Hamaker.
By Frease & Bond
Attorneys

Jan. 22, 1929.　　　　S. U. HAMAKER　　　　1,699,565
GEAR HOUSING AND BEARING
Filed Aug. 17, 1925　　　3 Sheets-Sheet 2

Inventor
Sidney U. Hamaker
By Frease and Bond
Attorneys

Jan. 22, 1929.  
S. U. HAMAKER  
1,699,565  
GEAR HOUSING AND BEARING  
Filed Aug. 17, 1925  
3 Sheets-Sheet 3
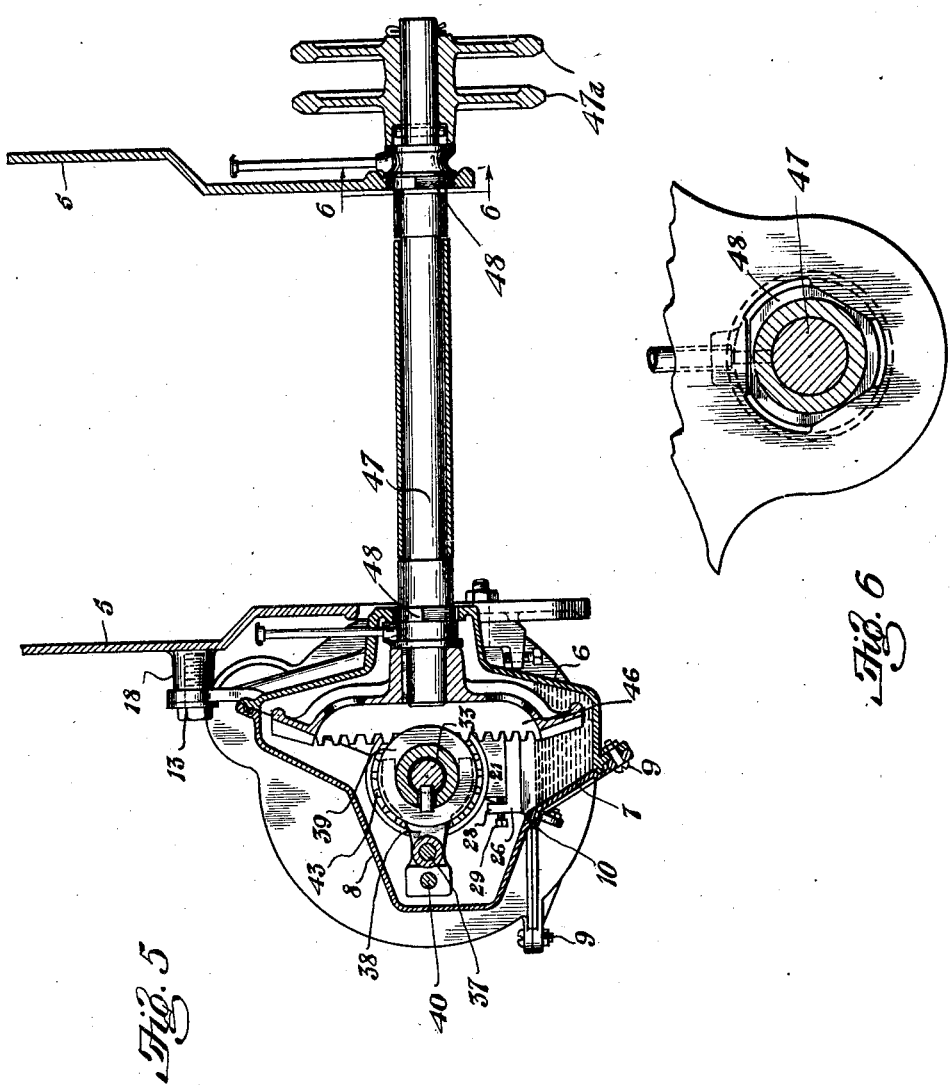
Inventor  
Sidney U. Hamaker.  
By Frease and Bond  
Attorneys Patented Jan. 22, 1929.

1,699,565

UNITED STATES PATENT OFFICE.

SIDNEY U. HAMAKER, OF CANTON, OHIO, ASSIGNOR TO THE JOSEPH DICK MANUFACTURING COMPANY, OF CANTON, OHIO, A CORPORATION OF OHIO.

GEAR HOUSING AND BEARING.

Application filed August 17, 1925. Serial No. 50,803.

This invention relates to a housing for the drive gearing of a fodder cutter or the like, and is provided with adjustable bearings for the various shafts of the gearing; and the object of the improvement is to provide a housing, for the drive gearing, which is adapted to be moved upon a pivotal point to properly adjust the gears, an adjustable bearing being provided for compensating for the pivotal movement of the housing, and laterally movable bearings being provided for compensating for wear in certain of the gears.

An embodiment of the invention is illustrated in the accompanying drawings, in which—

Figure 1:
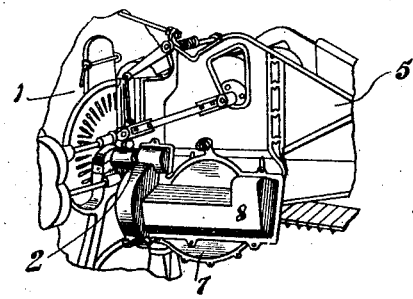
Figure 2:
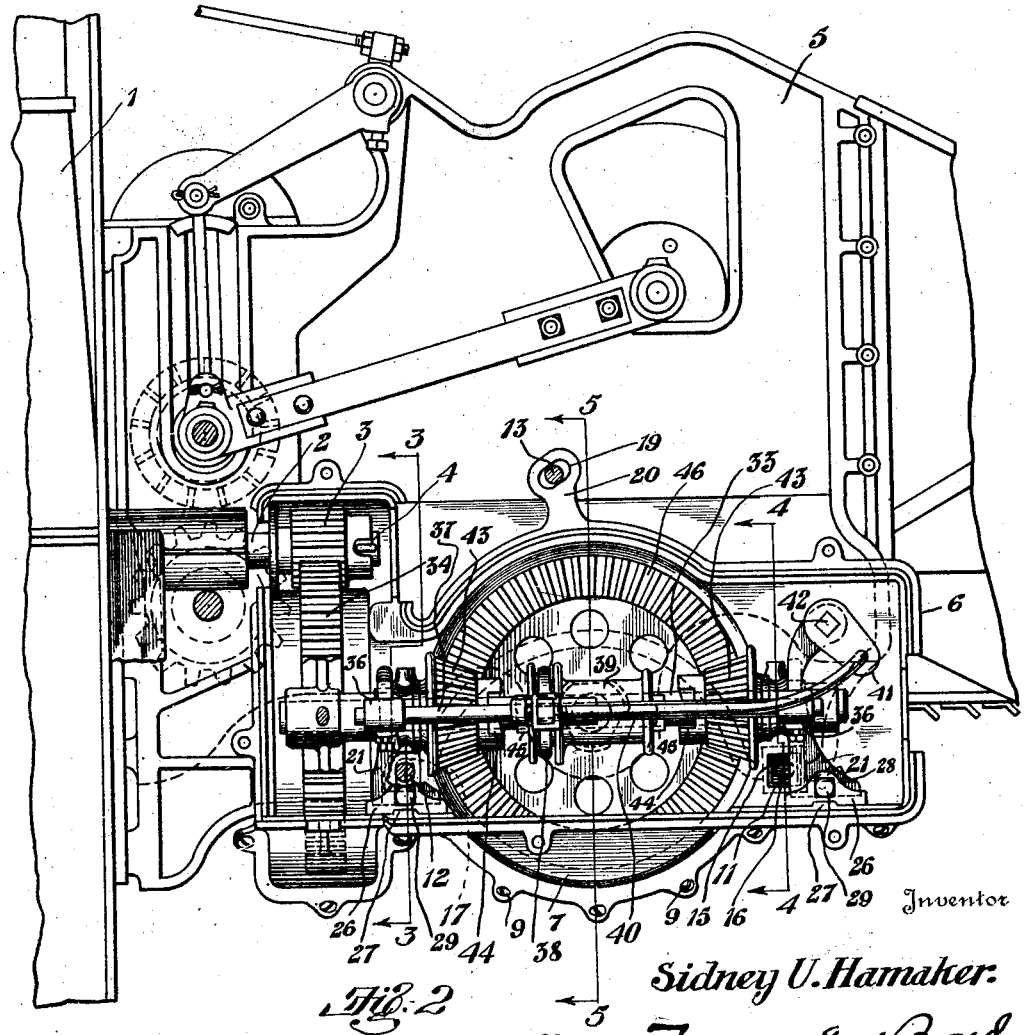
Figure 4:
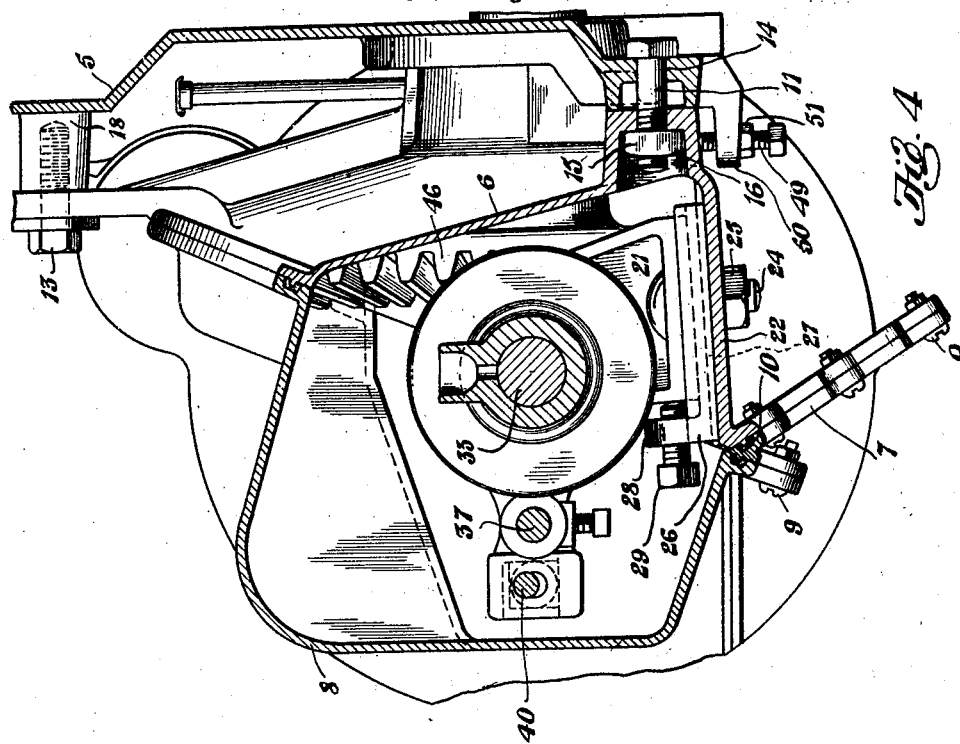
Figure 3:
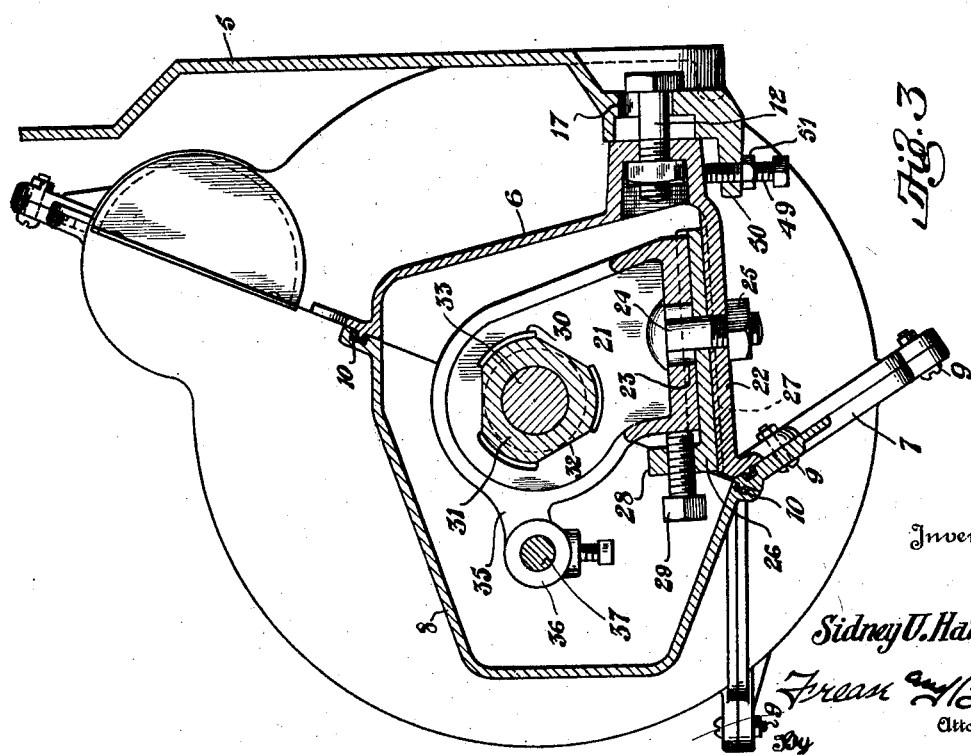

Figure 1 is a fragmentary perspective view of a portion of a fodder cutter provided with the improved gear housing;

Fig. 2, an elevation of the housing with the cover removed showing the gearing and bearings therein;

Fig. 3, a section on the line 3—3, Fig. 2;

Fig. 4, a section on the line 4—4, Fig. 2;

Fig. 5, a section on the line 5—5, Fig. 2; and

Fig. 6, a section on the line 6—6, Fig. 5.

Similar numerals of reference indicate corresponding parts throughout the drawings.

The gear housing to which the invention pertains is illustrated as applied to a fodder cutter, which includes a case 1 having the usual cutting and blowing mechanism therein rigidly mounted upon the shaft 2, which is journaled in the case and driven from any source of power, a pinion 3 being fixed upon the end portion of said shaft, as by a pin 4, said pinion being located within the housing to which the invention pertains, and driving the gearing which operates the feed mechanism located in the feed hopper 5.

The improved housing, within which all of this gearing is located, comprises the body member 6, the lower front plate 7, and the cover 8, which parts are connected together as by bolts 9, packing strips 10, of felt or the like, being located in the tongue and groove joints between the several parts of the housing.

The body portion 6 of the housing is connected to the side of the feed hopper by the bolts 11, 12 and 13, the bolt 11 extending through an aperture 14 in the sidewall of the feed hopper 5, and being provided with a nut 15 located within a squared socket 16 in said housing member, whereby the bolt may be tightened to any desired degree and the nut will be prevented from turning thereon.

The bolt 12 is extended through a vertical slot 17 in the sidewall of the feed hopper, the nut thereof being also located in a squared socket in the housing member 6; and the bolt 13 is carried by a lug 18 formed upon the sidewall of the feed hopper and located through an arcuate slot 19 formed in an ear 20 upon the upper edge portion of the housing member 6, said slot being located in an arc described around the axis of the bolt 11.

A pair of spaced brackets 21 is mounted upon the substantially horizontal portion 22 of the housing member 6, each of these brackets having a longitudinal slot 23 which receives a clamping bolt 24 extended through the wall 22 of the housing and provided with a nut 25 for clamping the bracket in adjusted position thereon. A bed plate 26, having a tongue and groove connection 27 with the housing, may be interposed between the bracket and housing and clamped against movement by the bolt 24.

A flange 28 is formed upon the end of the bed plate 26, and an adjusting screw 29 is threaded through the same and abuts the end of the bracket, whereby the bracket may be adjusted to any desired longitudinal position within the limits of the slot 23, and then clamped against movement by the clamping bolt.

Each of the brackets 21 is provided with an opening 30 which may be in the form of an irregular hexagon, as best shown in Fig. 3, and bearings 31 of substantially the same shape as said openings, are located therein, said bearings having the alternate flat faces 32 arranged for engagement with the corresponding faces of the opening.

A counter shaft 33 is journaled in the bearings 31, and has a gear 34 fixed to one end and arranged to mesh with the pinion 3 upon the drive shaft 2. Lugs 35 are provided upon the brackets 21 and have the bosses 36 formed thereon, said bosses carrying a rod 37, upon which is slidably mounted the fork 38 which engages the grooved clutch sleeve 39, fixed upon the countershaft 33.

A rod 40 connects the fork with a rocker arm 41 upon the shaft 42, which may be operated by any suitable exterior means for sliding the clutch sleeve longitudinally upon the shaft 33.

A pair of bevel pinions 43 is fixed upon the shaft 33 and provided with clutch fingers 44 arranged to be alternately engaged by the clutch fingers 45, upon the sleeve 39.

The bevel pinions 43 mesh with a bevel gear 46 fixed upon the shaft 47 which extends through the feed hopper, being journaled in bearings 48, similar to the bearings 31, which are located in the housing member 6 and the opposite side of the feed hopper, permitting a slight tilting movement of the shaft 47 to compensate for the pivotal adjustment of the housing. The shaft 47 may be provided with sprockets 47$^a$, or the like, through which the feed mechanism is driven.

In order to hold the housing in adjusted position, the adjusting screws 49 are threaded through the flanges 50, which may be formed upon the adjacent sidewall of the feed hopper 5, a jam nut 51 being provided upon each adjusting screw to lock the same in position.

As the shaft 2 is first properly lined up, it is necessary that the gear 34 be adjusted to mesh with the pinion 3, upon the shaft 2. With the present construction, it is obvious that the countershaft 33 may be adjusted, to bring the gear 34 into mesh with the pinion 3, without disturbing the alignment of the bevel pinions 43, with reference to the gear 46, as the entire gearing is moved bodily with the housing.

From the above it will be seen that the housing and bearings are quickly and readily adjustable to provide for properly meshing the gear 34 with the pinion 3 and the bevel pinions 43 with the bevel gear 46, and to compensate for any wear in said gearing.

As shown in Fig. 5, the lower portion of the housing may be filled with grease in order to keep all of the gears properly lubricated.

I claim:—

1. In combination with a shaft having a pinion thereon, a gear housing, a countershaft within the housing, a gear on the countershaft adapted to mesh with said pinion, means within the housing for adjusting the countershaft in one direction and means for adjusting the housing in another direction to move the gear into operative engagement with the pinion.

2. In combination with a shaft having a pinion thereon, a gear housing, a countershaft within the housing, a gear on the countershaft adapted to mesh with said pinion, means within the housing for slidably adjusting the countershaft in one direction and means for pivotally adjusting the housing in another direction, to move the gear into operative engagement with the pinion.

3. In combination with a shaft having a pinion thereon and a second shaft having a bevel gear thereon, a gear housing, a countershaft within the housing, a gear on the countershaft adapted to mesh with said pinion, bevel pinions on the countershaft adapted to mesh with said bevel gear, means within the housing for adjusting the countershaft in one direction and means for adjusting the housing in another direction, to move the gear and bevel pinions into operative engagement with the pinion and bevel gear respectively.

4. In combination with a shaft having a pinion thereon and a second shaft having a bevel gear thereon, a gear housing, a countershaft within the housing, a gear on the countershaft adapted to mesh with said pinion, bevel pinions on the countershaft adapted to mesh with said bevel gear, means within the housing for slidably adjusting the countershaft in one direction and means for pivotally adjusting the housing in another direction to move the gear and bevel pinions into operative engagement with the pinion and bevel gear respectively.

5. In combination with a shaft having a pinion thereon and a second shaft having a bevel gear thereon, a gear housing, bearings within the housing, a countershaft journaled in the bearings, a gear on the countershaft adapted to mesh with said pinion, bevel pinions on the countershaft adapted to mesh with said bevel gear, means within the housing for slidably adjusting the bearings to move the countershaft in one direction, and means for pivotally adjusting the housing in another direction, to move the gear and bevel pinions into operative engagement with the pinion and bevel gear respectively.

In testimony that I claim the above, I have hereunto subscribed my name.

SIDNEY U. HAMAKER.